July 20, 1965 H. E. CARLSEEN 3,195,437
APPARATUS FOR PROCESSING STRIPS OF ROLL FILM
Filed Aug. 3, 1962 4 Sheets-Sheet 1

INVENTOR.
HOWARD E. CARLSEEN
BY
LeRoy J. Leishman
AGENT

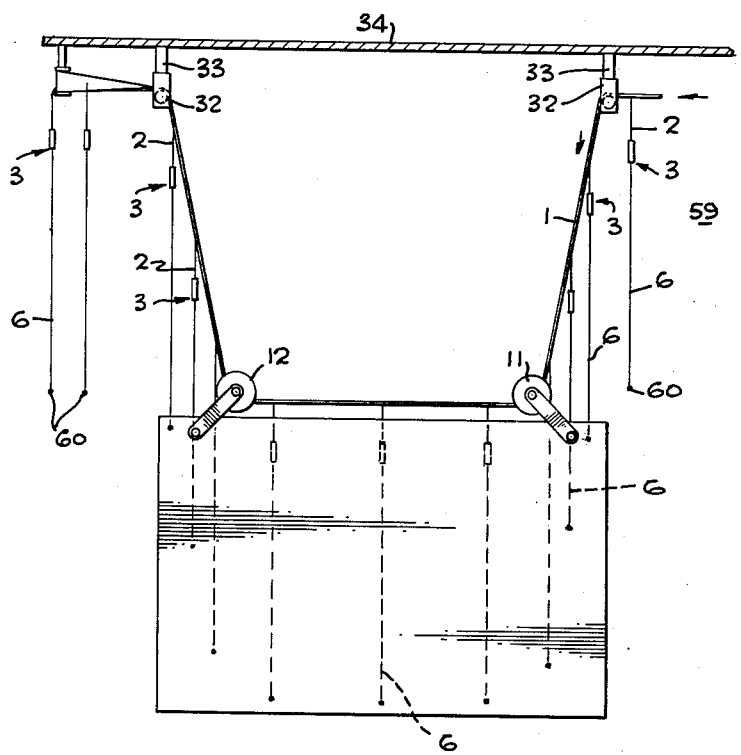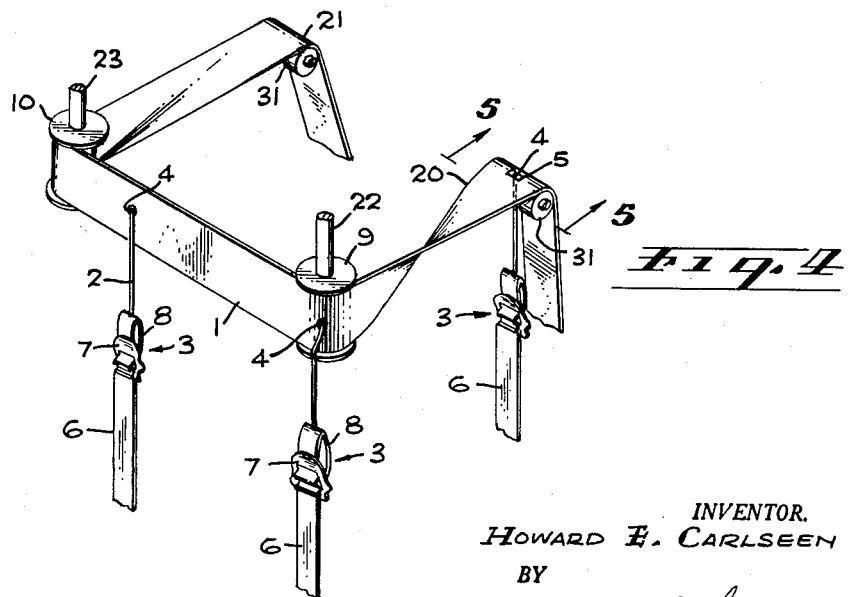

July 20, 1965  H. E. CARLSEEN  3,195,437
APPARATUS FOR PROCESSING STRIPS OF ROLL FILM
Filed Aug. 3, 1962  4 Sheets-Sheet 3

INVENTOR.
HOWARD E. CARLSEEN
BY
Le Roy J. Leishman
AGENT

July 20, 1965  H. E. CARLSEEN  3,195,437
APPARATUS FOR PROCESSING STRIPS OF ROLL FILM
Filed Aug. 3, 1962  4 Sheets-Sheet 4

INVENTOR.
HOWARD E. CARLSEEN
BY
Le Roy J. Leishman
AGENT

United States Patent Office 3,195,437
Patented July 20, 1965

3,195,437
APPARATUS FOR PROCESSING STRIPS
OF ROLL FILM
Howard E. Carlseen, 6721 Forbes Ave., Van Nuys, Calif.
Filed Aug. 3, 1962, Ser. No. 214,592
4 Claims. (Cl. 95—94)

The invention herein described pertains to film processing equipment, and more particularly to equipment used for processing strips of roll film.

Various types of equipment have been provided in the past for transporting and immersing strips of roll film successively in a series of tanks. A plurality of individual strips of roll film have sometimes been hung side by side on hangers, and these hangers with the depending strips of film have been carried by a conveyor system from one tank to another in which the hangers have been successively immersed. The conveyor systems used for such processes have usually been somewhat complicated because of the necessity of keeping the hangers properly spaced while in the various tanks as well as during the process of immersing them and bringing them back out again. Other methods have involved attaching the individual strips of film together in order to make them a part of a continuous belt. Still other apparatus has been provided in which both ends of each individual strip of film have been attached to a conveyor belt with a little slack in each individual strip between its two points of connection with the conveyor.

One object of the present invention is to provide equipment for moving the film through the various solutions and baths in proper succession without involving any of the complexities that have been inherent in previous equipment.

Another object is to provide equipment so designed that only one end of each strip of film need be attached to the conveyor belt.

An additional object is to provide equipment that will permit the individual strips of film to hang vertically without being attached to one of a series of frames requiring different conveying means for moving them horizontally from that required to move them vertically or in a slanting direction for immersion in the various tanks and for their removal therefrom.

Another object is to provide simple belt positioning apparatus so that the plane of the belt may be changed from vertical to horizontal or vice versa as it moves from one elevation or location to another.

A further object is the provision of belt-guiding and supporting means that will permit the film to hang vertically from the conveyor belt even while the belt is moving between portions of its travel where it must move horizontally and other portions where it must move vertically or at a sloping angle.

Still another object is to provide a suitable intermediate structure for attaching a strip of film to the conveyor belt, and to do this in such a simple manner that the attachment or detachment of the film may be accomplished while the conveyor belt is in motion.

Still other objects will appear as the specification proceeds.

In the drawings:

FIG. 3 is a front elevation of a portion of my conveyor system, one of the tanks used in the processing of the film, and a plurality of individual strips of film attached to the conveyor belt.

FIG. 4 is a view of a portion of my conveyor system showing strips of film attached to the belt as it changes its plane from vertical to horizontal, or vice versa, and as it moves over supporting and positioning rollers between horizontal and sloping positions of the belt.

Figure 1:
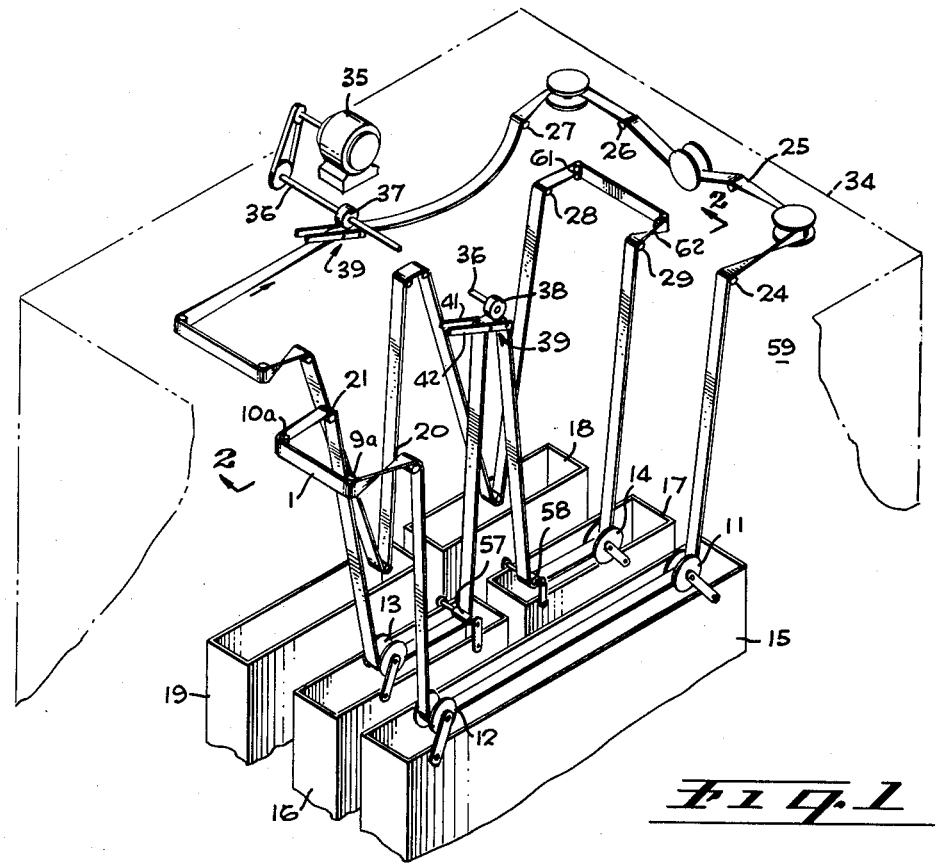
FIG. 1 is an isometric view, partly broken away, of the apparatus by means of which the film may be moved from one level to another and laterally from one general vertical plane to another, this illustration showing also a suitable method for driving the endless conveyor belt.

In order to transport disconnected strips of photographic roll film through the various tanks or baths used in processing the exposed film, I employ an endless belt 1 best shown in its various positions and orientations in FIG. 1. I hang from this conveyor belt a series of spaced pendicles, FIGS. 3, 4 and 5, each comprising a flexible member 2 and a clip or clamp 3. One end of each flexible member is hung from the belt intermediate its edges as indicated at points 4 in FIGS. 4 and 5. This is done by passing member 2 through an aperture 75 in the belt and then looping it around a pin or thin rod 76 disposed crosswise of the belt. To maintain the pins in this position relative to the belt, I place a strip of suitable flexible material 5 over each of them and cement the protective strips to the belt.

Figure 5:
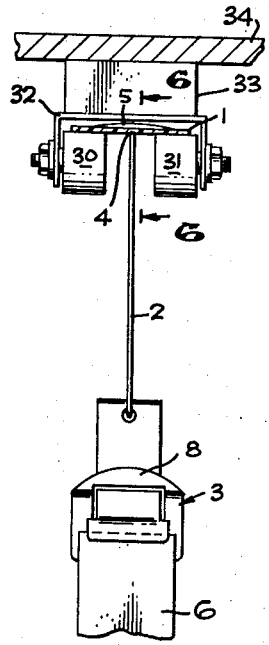
FIG. 5 is a view taken on line 5—5 of FIG. 4.
Figure 6:
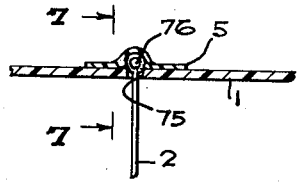
FIG. 6 is a sectional view taken on line 6—6 of FIG. 5.
Figure 7:
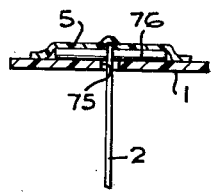
FIG. 7 is another sectional view taken on line 7—7 of FIG. 6.

The individual pieces of roll film 6 are each attached to one of the clips, as best shown in FIGS. 4 and 5. These clips or clamps are of any suitable commercial variety, no invention being claimed in this component per se. If the equipment employs the type of clamp shown in FIGS. 4 and 5, the jaws of the clamp are opened by squeezing the clamp between the thumb and forefinger at points 7 and 8. When a clamp has been opened in this manner, one end of a strip of roll film may be slipped between its jaws which then close under action of the spring stock from which this particular type of clamp is fabricated.

Figure 2:
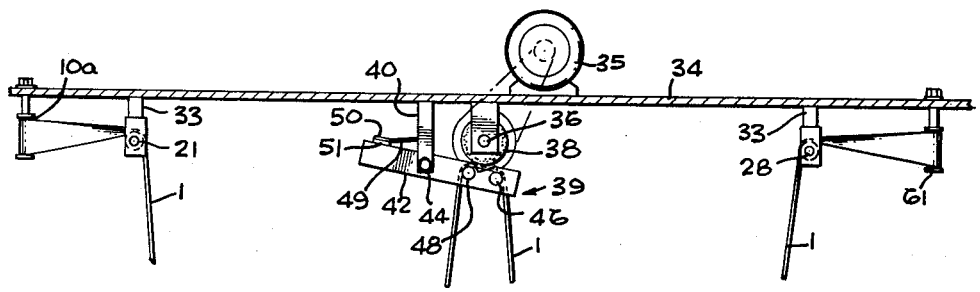
FIG. 2 is a view taken on line 2—2 of FIG. 1.

The endless belt, with the aforementioned pendicles and attached strips of film hanging therefrom, is mounted by means of pulleys and rollers as hereinafter described and propelled by any suitable driving means, one such driving means being indicated in FIGS. 1 and 2 which will be described after the construction and function of the spools and rollers have been explained.

In various portions of the path of the belt, as when the strips of film are being moved through certain of the tanks, the belt must move in a horizontal direction, and the plane of the belt must also be horizontal. Whenever the belt is to move in a horizontal direction with its plane disposed horizontally, I prefer to support the belt by means of spools having their axes or rotation disposed horizontally, as indicated by the orientation of spools 11 and 12 in FIGS. 1 and 3 by spools 13 and 14 in FIG. 1. As will be obvious from these figures, the opposite flanges of the spools guide and position the belt.

When the belt must move from one portion of its circuit as indicated at 20, FIG. 4, where the plane of the belt is horizontal to another parallel portion of its circuit where the belt is also horizontal, as at 21, the belt must move through an intermediate space where its plane must be disposed vertically. In other words, it must be "banked." In order to accomplish this, I provide flanged pulleys with their axes of rotation disposed vertically, and I mount two of such pulleys so that their axes of rotataion and therefore their pivot shafts are positioned parallel to each other as indicated by shafts 22 and 23 for spools 9 and 10 respectively, FIG. 4.

In some portions of the belt's circuit, the supporting rotatable members must be disposed beneath the belt as is the case with rotatable members 24, 25, 26, 27, 28, 29, etc., FIG. 1. Rotatable supporting structures that are disposed in this manner must have provisions whereby the flexible member 2 of each of the pendicles may hang down vertically despite the fact that the rotatable guide members are positioned beneath the belt. In order to accomplish this, I have devised a structure perhaps best illustrated in FIGS. 4 and 5, although a portion of the detail is not visible in FIG. 4. In this arrangement, a pair of spaced rollers 30 and 31 are rotatably mounted with their axes in axial alignment, as indicated in FIG. 5. The stub shafts that provide these axes are mounted in a yoke 32 attached to or made integral with a bracket 33 depending from an overhead panel or ceiling structure 34. As any portion of the belt proceeds over these rollers, the flexible members 2 of the pendicles that each comprise a flexible member 2 and a clamp 3, hang down by gravity between the two rollers of the pair.

Figure 8:
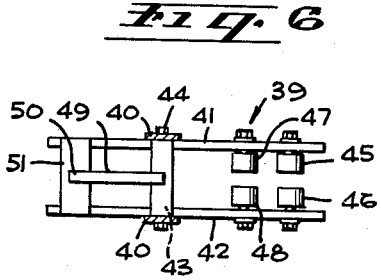
FIG. 8 is a plan view of a spring-loaded rockable device which I employ for keeping the film in contact with each of the rotating rollers that impart motion to the belt.

In order to impart movement to the conveyor belt, I provide a motor 35, FIG. 1, operatively connected to a shaft 36 having a pair of rollers 37 and 38 mounted thereon for positive rotation therewith. Each of these rollers cooperates with a structure 39, FIGS. 1, 2, and 8, which keeps the belt in firm engagement with the periphery of the roller. The structure 39 comprises a rocker rotatably carried in a bracket, such as bracket 40 in FIG. 2, which is attached to the panel or ceiling 34. In one suitable embodiment, the structure 39 comprises a pair of parallel strips 41 and 42 rigidly attached to a spacing sleeve 43, FIG. 8, rotatably mounted on a shaft or bolt 44 connecting the two arms of bracket 40. Two pairs of spaced rollers 45–46 and 47–48 are mounted between the parallel bars 41 and 42 with the shafts of each pair of rollers in axial alignment. When the rocking assembly 39 is properly mounted and positioned with respect to its associated driving roller, such as roller 38, FIG. 2, the two aligned pairs of rollers that constitute parts of the rockable structure 39 must press firmly against the periphery of the large driving roller. In order to provide the necessary pressure or tension, I spring load the rocker by any suitable means such as the leaf spring 49, FIGS. 2 and 8, which is attached at one end to the bracket 40, FIG. 2, and so constructed and mounted that its outer end 50 bears upon the cross member 51 rigidly attached to the side pieces 41 and 42 of the rockable structure. Inasmuch as two such rockers are provided to cooperate respectively with the widely spaced driving rollers 37 and 38, the conveyor belt is driven from two different positions.

Figure 10:
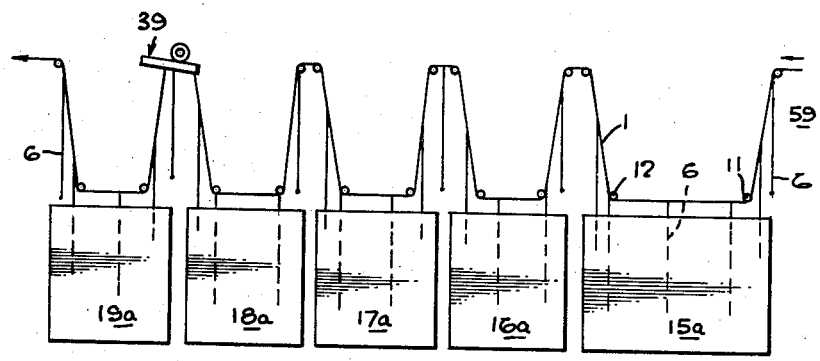
FIG. 10 is a schematic drawing showing various tanks arranged in alignment with vertically hanging strips of film attached to the conveyor belt and being transported from right to left.

The function of the conveyor belt, of course, is to move the vertically hanging strips of film in and out of the particular solutions required in the particular processing system being employed. This usually includes a conventional developing tank 15, a hypo or fixing tank 17 and a washing tank 18. Other tanks may be provided for solutions not always used in the processing of exposed film, such as tank 16, FIG. 1, for a solution that stops or arrests the action of the developing solution and a "wetting" tank 19 for a solution that causes the water remaining on the washed film to flow off more readily. Instead of disposing these tanks so that some of them are in a side by side relationship as shown in FIG. 1, it is of course possible to place them all in alignment as indicated by tanks 15a, 16a, 17a, 18a and 19a in FIG. 10, which correspond to those in FIG. 1, bearing the same numerals without the additional lower case letters.

Figure 9:
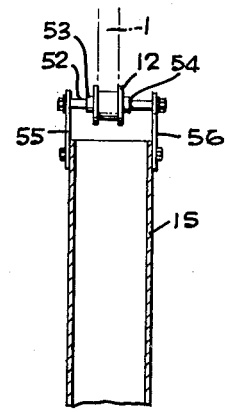
FIG. 9 is a broken-away sectional view of one of the tanks showing a spool-like device that I employ for supporting and guiding my conveyor belt, this view also showing the structure that supports the spool-like wheel in its required position relative to the tank.

The horizontally disposed rollers that guide the conveyor belt in the areas at the top of the tanks may each be mounted as indicated in FIG. 9. This view shows the spool 12 centrally positioned on a shaft 52 by means of a pair of collars 53 and 54, shaft 52 being supported near the upper ends of straps 55 and 56 adjustably attached to the sides of the tank, the tank in this figure being tank 15 which serves as a representation for all of the other tanks requiring guide rollers or spools with horizontally disposed axes. The conveyor belt may be tightened over any tank by moving the upper ends of the pair of straps which support one roller either closer to or further away from the spool supporting the belt at the opposite end of the tank. The length of time that the film remains in any tank can be controlled by the spacing adjustably provided between the belt-positioning spools.

In certain positions throughout the travel of the conveyor belt, it is sometimes preferable to use only one flanged spool. In this case a simple roller may be provided for one end of the travel of the belt over a given tank. Rollers 57 and 58, FIG. 1, are so positioned, these rollers cooperating respectively with the flanged spools 13 and 14.

Figure 11:
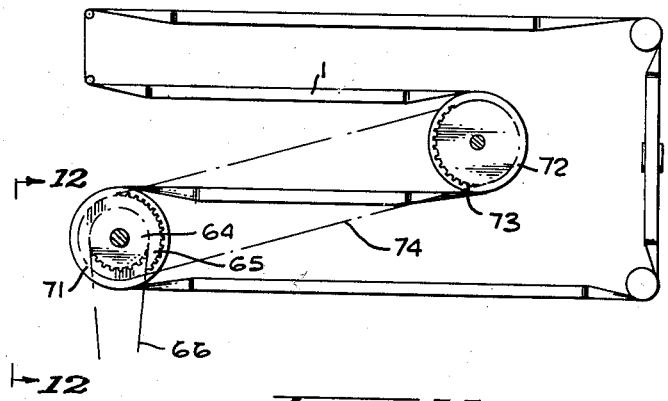
FIG. 11 is a plan view of a conveyor belt arrangement showing a modified drive.
Figure 12:
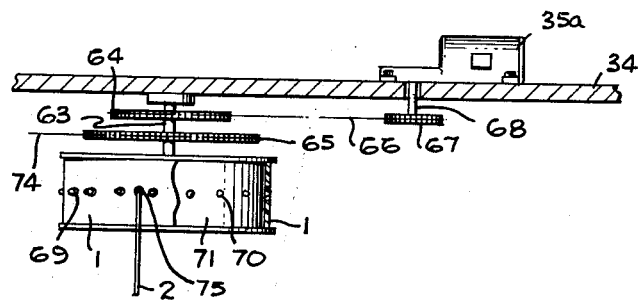
FIG. 12 is a section taken on line 12—12 of FIG. 11.

An alternative method of driving the conveyor belt is illustrated in FIGS. 11 and 12. In this arrangement, the two pulleys or spools 9 and 10 of FIG. 4, which correspond to rollers 9a and 10a of FIG. 1, are replaced by a large drum 71 whose diameter equals the distance from the right side of spool 9 to the left side of spool 10, and instead of the belt 1 being suspended between two spools as in FIG. 4 it follows around half the periphery, or 180 degrees, of pulley 71. Drum 71 is rigidly attached to the shaft 63 to which also is affixed a pair of sprocket wheels 64 and 65. Sprocket wheel 64 is driven by an endless chain 66 which meshes with sprocket 67 attached to the slow speed shaft 68 of the built-in speed reducer of the motor 35a. The large drum 71 of course provides more traction for the conveyor belt than does roller 37 or 38 in FIG. 1, but a still more positive drive is afforded by providing the belt with an endless series of holes to cooperate with teeth or pins 70 evenly spaced around the periphery of drum 71.

Belt 1 may be similarly driven by an additional toothed drum 72, FIG. 11, located in the general vicinity of the vertical rollers 61 and 62 of FIG. 1. This second belt-driving drum is rotated by sprocket wheel 73, keyed to the same shaft as this second drum. Sprocket wheel 73 has the same number of teeth as sprocket wheel 65, and inasmuch as they are cooperatively connected by the endless chain 74, they of course rotate at the same speed.

At least part of the apparatus hereinbefore described must of course be protected from light, which may be done by appropriate partitioning. Space must be provided for attaching the unprocessed film to the conveyor belt before it reaches the developing tank and for removing it from the belt after it has been completely processed. A suitable loading area is indicated at 59 in FIGS. 1, 3 and 10. In area 59 the belt is aproaching the developing tank 15, or 15a in FIG. 10, and the individual strips of film must each be attached to one of the spaced pendicles as hereinbefore described. In order to make sure that the strips of film 6 hang in a vertical direction, a suitable weight 60, FIG. 3, may be attached to the lower end of each strip of film, another clamp such as clamp 3 serving admirably for this purpose. After the strips of film have been completely processed by pasing them through the various solutions, they may be unloaded or disconnected from the pendicles in the unloading area 61 shown in FIGS. 1 and 10, or in area 59 just before attaching the strips that are to be processed.

Various modifications may of course be made in the structure and arrangement of the film processing equipment hereinbefore described and shown in the drawing. Different elements may be substituted for those described so long as the substitute elements perform the same function or include the same function as the elements for which they are substituted, and the parts may be rearranged and transposed and additional components added without departitng from the broad spirit of my invention as succinctly set forth in the appended claims.

I claim:

1. In apparatus for processing unjoined strips of photographic film, a combination including: a developing tank; a fixing tank; a washing tank; and a conveyor system for said strips, said system comprising (a) an endless belt, (b) means so mounting said belt that it traverses in discontinuous succession a first area vertically spaced above said tanks, a second area adjacent the top of said developing tank, a third area adjacent the top of said fixing tank, and a fourth area adjacent the top of said washing tank, said second, third and fourth areas each being below said first area, said mounting means comprising a plurality of belt-guiding spools having vertical axes of rotation for maintaining the contacting portions of said belt in vertical orientation as it moves in a horizontal path within said first area above said tanks, and a plurality of pairs of spaced rollers located in said first area and having their axes of rotation in horizontal alignment, some of said pairs acting to position said belt as it moves over and then partially around them en route downward to one of said other areas, and others of said pairs acting to position the belt as it moves partially around and then over them en route from one of said other areas to said first area above said tanks; a plurality of spaced pendicles depending from said belt, each of said pendicles comprising (a) a flexible member having one end so attached to said belt intermediate the belt's edges that it will hang down between the rollers of any pair which the adjacent portions of the belt may be passing over and (b) a clip for hanging an unrolled strip of film therefrom, said clip attached to the other end of said flexible member; and power-driven means for moving said belt.

2. In apparatus for processing unjoined strips of photographic film, a combination including: a developing tank; a fixing tank; a washing tank; and a conveyor system for said strips, said system comprising (a) an endless belt, (b) means so mounting said belt that it traverses in discontinuous succession a first area vertically spaced above tanks, a second area adjacent the top of said developing tank, a third area adjacent the top of said fixing tank, and a fourth area adjacent the top of said washing tank, said second, third and fourth areas each being below said first area, said mounting means comprising (a) a plurality of first belt-guiding spools having vertical axes of rotation for maintaining the contacting portions of said belt in vertical orientation as it moves in a horizontal path in said first area above said tanks (b) a plurality of second belt-guiding spools each having a horizontal axis of rotation for maintaining the contacting portions of said belt in horizontal orientation adjacent the top of one of said tanks, and (c) a plurality of pairs of aligned spaced rollers located in said first area and having horizontal axes of rotation for positioning said belt, certain of said pairs acting as the belt moves over and partially around the pair to change the path of the belt from horizontal to sloping en route from said first area to one of said other areas, and others of said pairs acting as the belt moves partially therearound and thereover to change the path of the belt from sloping to horizontal en route from one of said other areas to said first area; and a plurality of spaced pendicles depending from said belt, each of said pendicles comprising (a) a flexible member having one end so attached to said belt intermediate the belt's edges that it will hang down between the rollers of any pair which the adjacent portions of the belt may be passing over and (b) a clip for hanging an unrolled strip of film therefrom, said clip attached to the other end of said flexible member; and power-driven means for moving said belt.

3. In apparatus for processing unjoined strips of photographic film, a combination including: a developing tank; an arresting tank; a fixing tank; a washing tank; and a conveyor system for said strips, said system comprising (a) an endless belt, (b) means so mounting said belt that it traverses in discontinuous succession a first area vertically spaced above said tanks, a second area adjacent the top of said developing tank, a third area adjacent the top of said arresting tank; a fourth area adjacent the top of said fixing tank; and a fifth area adjacent the top of said washing tank, said first area being at a higher level than said other areas, said mounting means comprising a plurality of belt-guiding spools having vertical axes of rotation for maintaining the contacting portions of said belt in vertical orientation as it moves in a horizontal direction at an altitude above said tanks, and a plurality of pairs of spaced rollers having their axes of rotation in horizontal alignment, some of said pairs acting to position said belt as it moves over and then partially around them en route from said first area to one of the other areas and others of said pairs acting to position the belt as it moves partially around and then over them en route from one of said other areas to said first area; a plurality of spaced pendicles depending from said belt, each of said pendicles comprising (a) a flexible member having one end so attached to said belt intermediate the belt's edges that it will hang down between the rollers of any pair which the adjacent portions of the belt may be passing over and (b) a clip for hanging an unrolled strip of film thereform, said clip attached to the other end of said flexible member; and power-driven means for moving said belt.

4. In apparatus for processing unjoined strips of photographic film, a combination including: a developing tank; an arresting tank; a fixing tank; a washing tank; and a conveyor system for said strips, said system comprising (a) an endless belt, (b) means so mounting said belt that it traverses in discontinuous succession a first area vertically spaced above said tanks, a second area adjacent the top of said developing tank, a third area adjacent the top of said arresting tank; a fourth area adjacent the top of said fixing tank; and a fifth area adjacent the top of said washing tank, said first area being at a higher level than said other areas, said mounting means comprising (a) a plurality of first belt-guiding spools having a vertical axis of rotation for maintaining the contacting portions of said belt in vertical orientation as it moves in a horizontal path in said first area above said tanks, (b) a plurality of second belt-guiding spools each having a horizontal axis of rotation for maintaining the contacting portions of said belt in horizontal orientation adjacent the top of one of said tanks, and (c) a plurality of pairs of aligned spaced rollers located in said first area and having horizontal axes of rotation for positioning said belt, certain of said pairs acting as the belt moves over and partially around the pair to change the path of the belt from horizontal to sloping en route from said first area to one of said other areas, and others of said pairs acting as the belt moves partially therearound and thereover to change the path of the belt from sloping to horizontal en route from one of said other areas to said first area; and a plurality of spaced pendicles depending from said belt, each of said pendicles comprising (a) a flexible member having one end so attached to said belt intermediate the belt's edges that it will hang down between the rollers of any pair which the adjacent portions of the belt may be passing over and (b) a clip for hanging an unrolled strip of film therefrom, said clip attached to the other end of said flexible member; and power-driven means for moving said belt.

(References on following page)

References Cited by the Examiner

UNITED STATES PATENTS

| | | | |
|---|---|---|---|
| 2,124,106 | 7/38 | Dye | 95—89 |
| 2,224,947 | 12/40 | Blaney | 95—94 X |
| 2,359,476 | 10/44 | Gravely | 118—423 X |
| 2,386,781 | 10/45 | Daly | 95—89 |
| 2,903,996 | 9/59 | Schwebs | 118—423 X |

NORTON ANSHER, *Primary Examiner.*

EMIL G. ANDERSON, EVON C. BLUNK, *Examiners.*